Oct. 4, 1949.　　　H. A. HICKS ET AL　　　2,483,974
WHEEL SUSPENSION FOR MOTOR VEHICLES
Filed Oct. 8, 1945　　　4 Sheets-Sheet 1

INVENTORS,
Harold A. Hicks,
Clifford C. Jackson.
BY Harness & Harris
ATTORNEYS.

Oct. 4, 1949.                H. A. HICKS ET AL                2,483,974
                        WHEEL SUSPENSION FOR MOTOR VEHICLES
Filed Oct. 8, 1945                                     4 Sheets-Sheet 4

INVENTORS.
Harold A. Hicks,
Clifford C. Jackson.
BY Harness & Harris
ATTORNEYS.

Patented Oct. 4, 1949

2,483,974

UNITED STATES PATENT OFFICE 2,483,974

WHEEL SUSPENSION FOR MOTOR VEHICLES

Harold A. Hicks and Clifford C. Jackson, Detroit, Mich., assignors to Chrysler Corporation, Highland Park, Mich., a corporation of Delaware Application October 8, 1945, Serial No. 621,036

2 Claims. (Cl. 280—124)

This invention relates to improvements in motor vehicles and more particularly to wheel suspension therefor.

An object of the invention is the provision of a simplified design of wheel suspension of the independently sprung type which affords improved riding qualities and in which friction and bearing loads incident to road wheel displacement are effectively minimized.

Another object of the invention is to provide a wheel suspension of the foregoing type in which the unsprung wheel supports and the weight supporting springs are so relatively arranged that the major portion of shock induced by wheel displacement is directed to and absorbed by the weight supporting springs, thereby relieving the wheel supports of such loads; and to provide an arrangement as above in which a weight supporting coil spring works in a substantially vertical plane and is subjected to a minimum of tilting under the influence of wheel displacement.

A further object of the invention is to provide an independent wheel supension of the trailing parallelogram arm type including an improved knuckle support having articulated connections with the wheel support arms and so seating a weight supporting coil spring as to permit the latter to work in a vertical plane and to absorb the major portion of shock due to wheel displacement.

A still further object of the invention is the provision, in conjunction with an independent wheel suspension, of a simplified and direct acting stabilizer or anti-sway device for minimizing body roll and which exercises a controlling action over relative rising and falling movement of the suspended wheels; and to provide a device of this type which, in the performance of its function, accommodates relative rising and falling wheel movement to the predetermined limits prescribed for the suspension. More particularly the invention provides in the foregoing respect a linkless torsion bar directly connected to independently oscillatable wheel suspension arms and disposed adjacent to the axis of oscillation of these arms and in such proximity to this axis that the bar is free from any appreciable endwise tension.

Other objects and advantages of the invention will be more apparent from the following description taken in connection with the accompanying drawings, in which.

Figure 1:
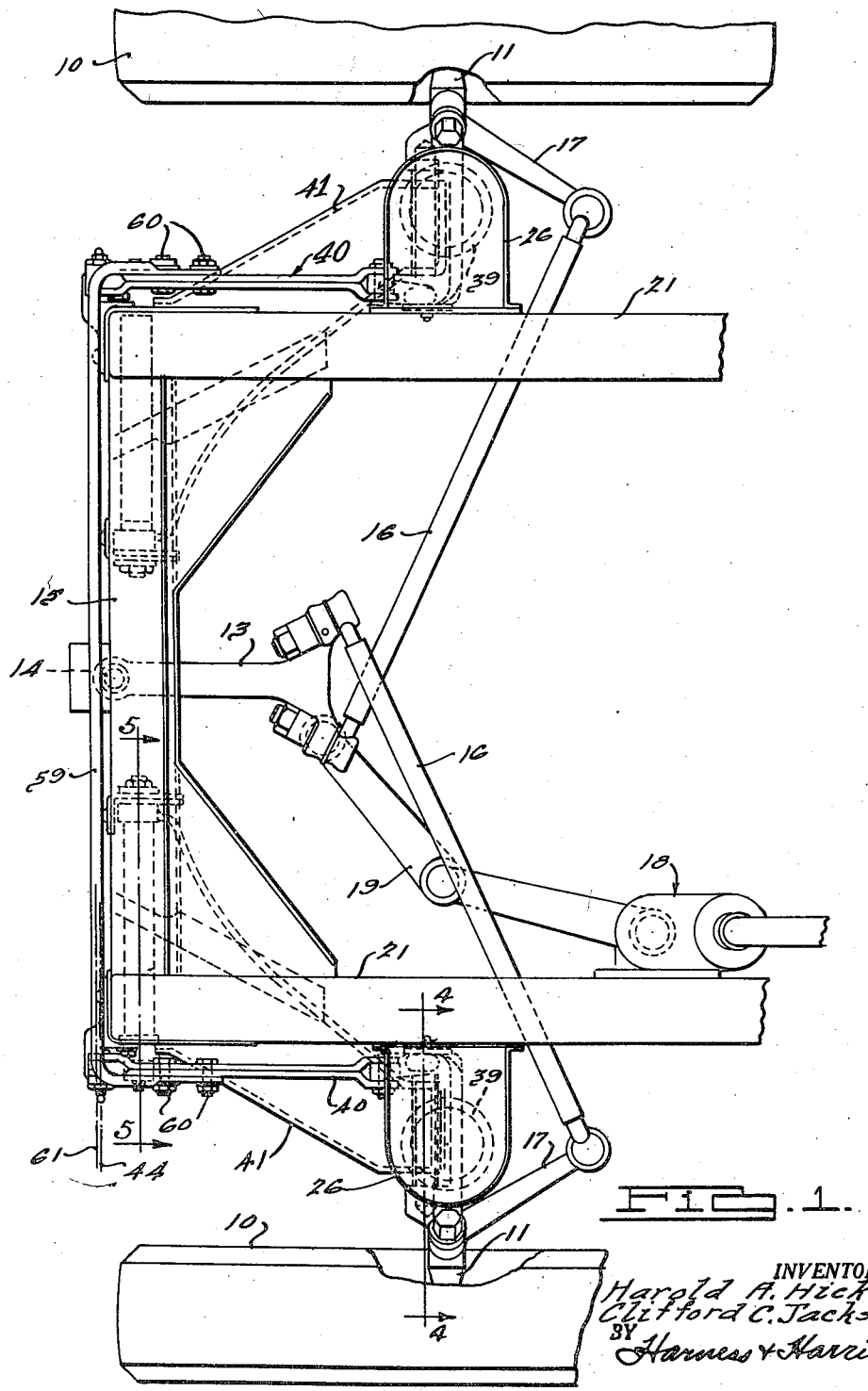
Fig. 1 is a top plan view illustrating the invention applied to steerable ground wheels of a motor vehicle, portions of the sprung part, shown in Figs. 2 and 3, being omitted.

Referring to the drawings, the invention is illustrated in an independent wheel suspension of the trailing arm type for steerable road wheels 10, each rotatable in the usual manner on a spindle 11 having a knuckle swively connected for steering movement to a knuckle support 12. For steering there is provided an arm 13 pivotally supported at 14 from a channel-shaped cross-member 15 and connected by a tie rod 16 to a steering arm 17 of each spindle 11. The arm 13 and rods 16 are actuated by a steering mechanism, generally indicated at 18, through a link connection 19.

Figure 2:
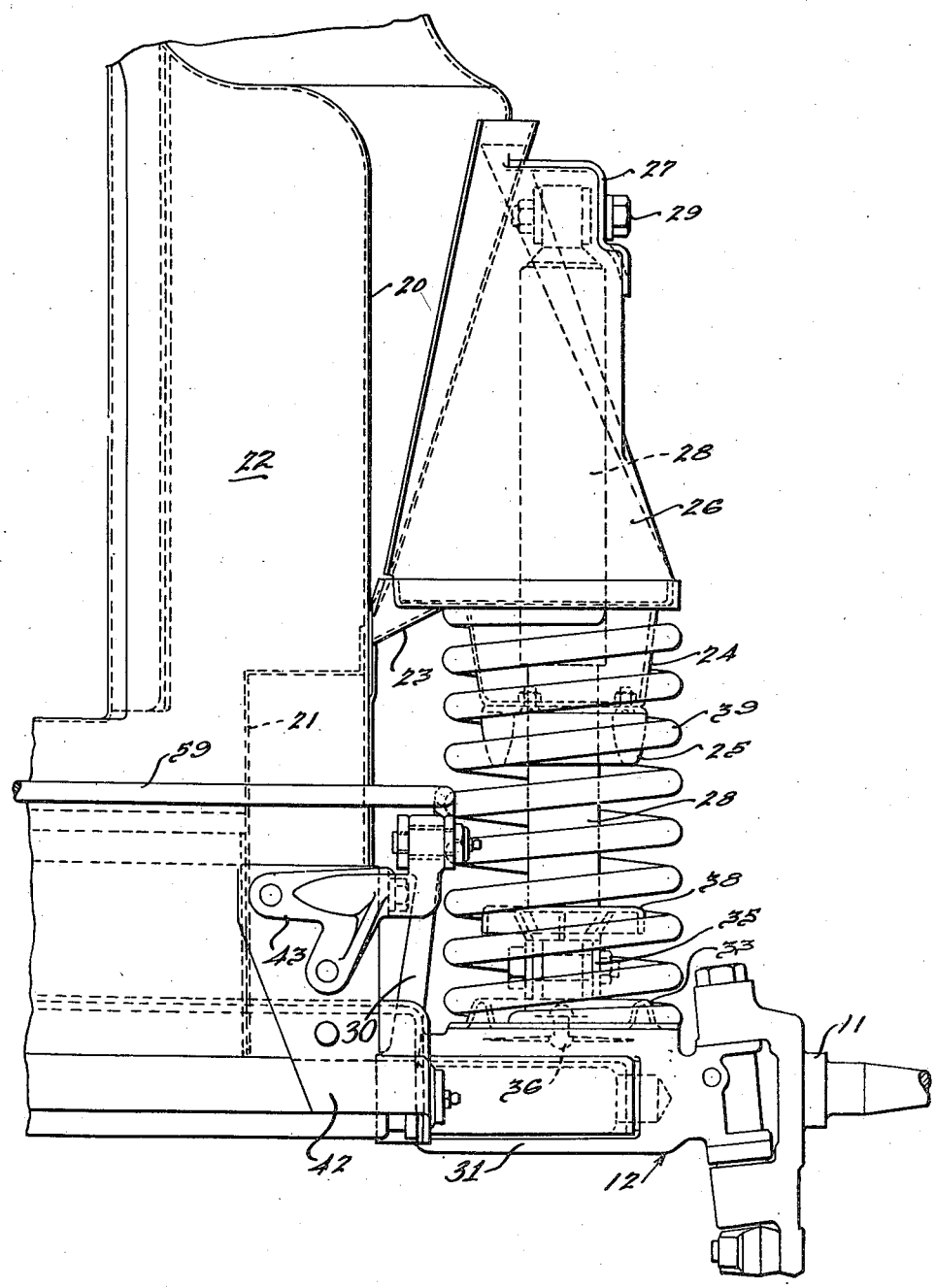
Fig. 2 is an enlarged front elevational view illustrating a typical wheel suspension and springing associated therewith.
Figure 3:
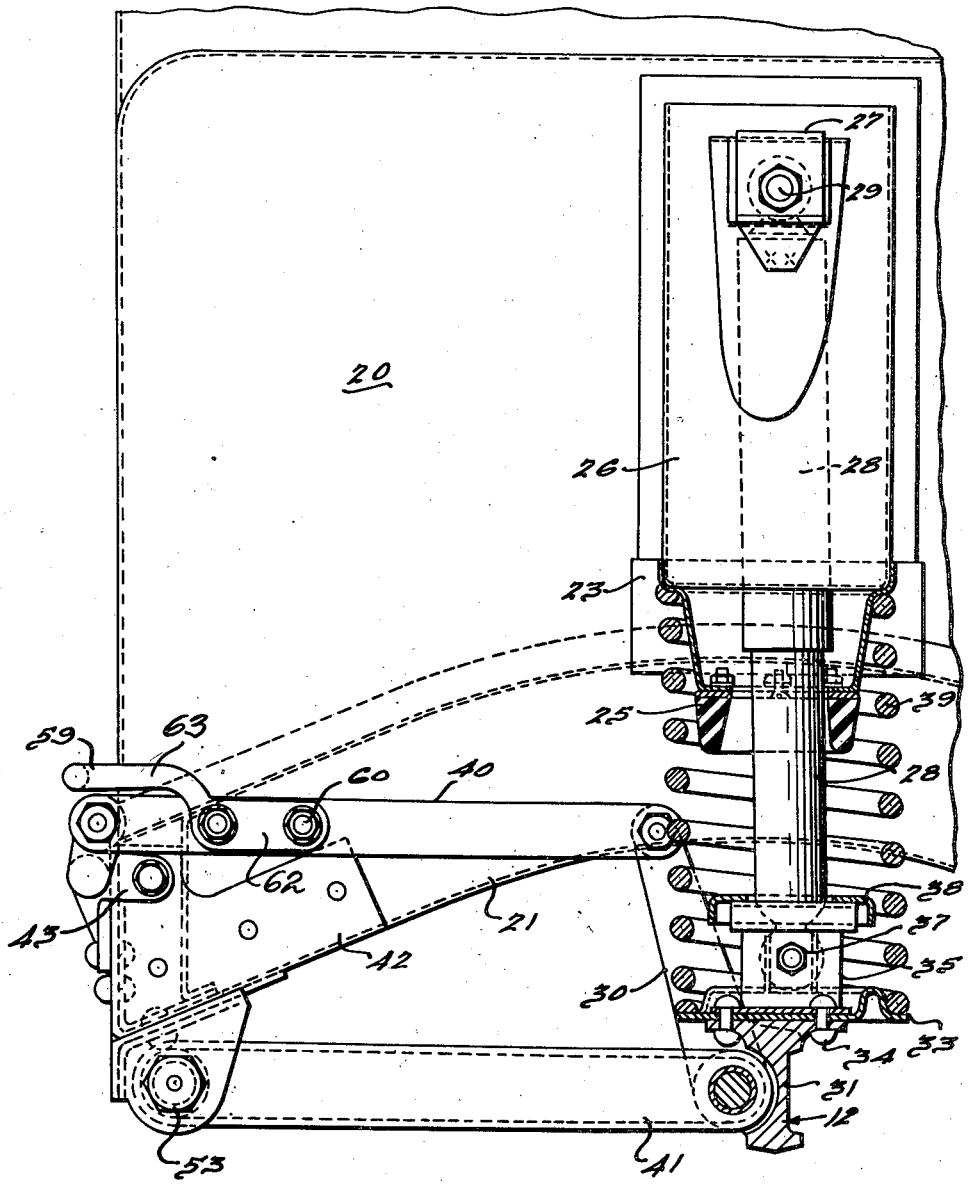
Fig. 3 is a side elevational view of the Fig. 2 showing, partly in section.

The vehicle body includes sheet metal side panels 20, one of which is shown in Figs. 2 and 3, which panels extend forwardly from the vehicle cowl, not shown, and terminate adjacent the forwardly disposed end of laterally spaced longitudinally extending rails 21 connected by the cross-member 15, the terminal ends of the panels being flanged inwardly as indicated at 22 in Fig. 2. Each panel 20 has secured thereto a spring seat 23 having a downwardly extending spring centering part 24 to which is secured a jounce bumper 25 of rubber or like material. Each spring seat 23 is stabilized, particularly against upward displacement, by a reinforcement 26 secured to the associated panel 20 and having a bracket 27 to which the upper end of a telescoping type shock absorber 28 is fixed by a bolt 29.

Figure 4:
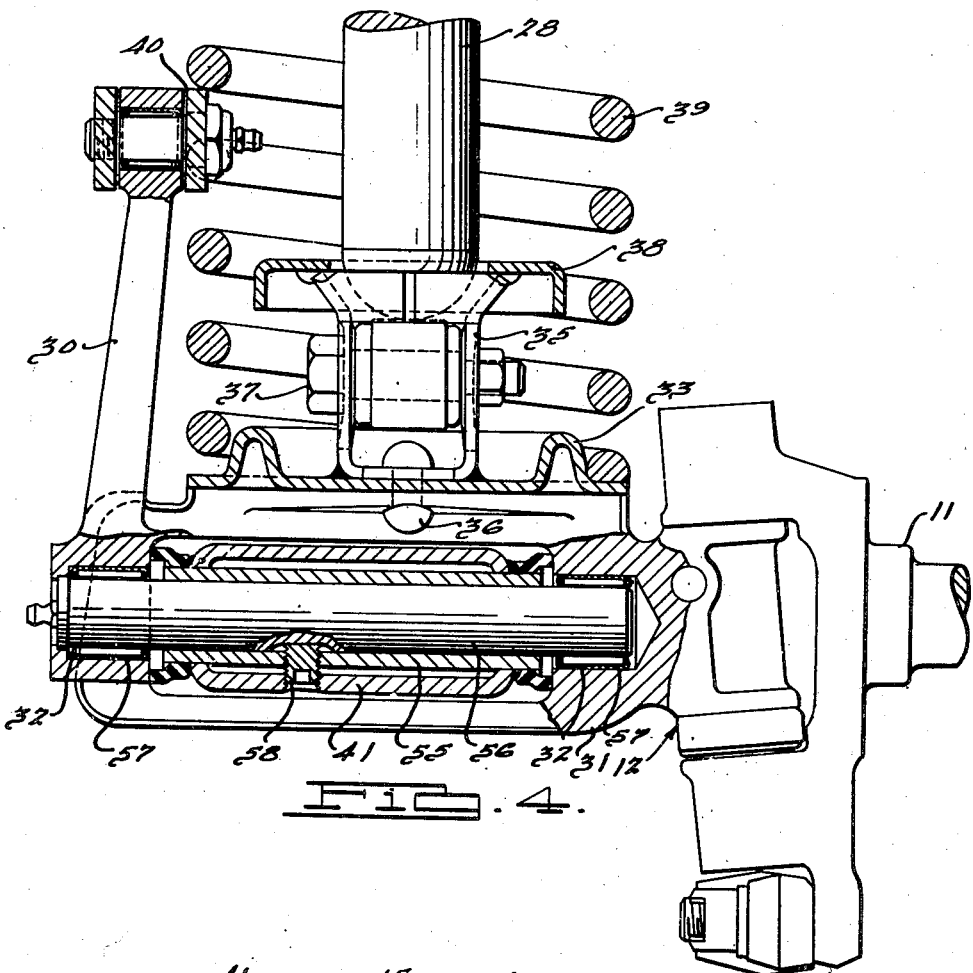
Fig. 4 is an enlarged view, mainly in section, taken approximately on the line 4—4 of Fig. 1.

Referring to the knuckle support 12, the same is preferably provided by a one-piece forging and includes a generally vertically extending arm 30 and a horizontally extending part 31 having longitudinally spaced enlargements adjacent the respective ends thereof and each provided with a bore 32 in axial alignment one with the other, all as shown more particularly in Fig. 4. The part 31 has a portion thereof extending above the bores 32 and relatively enlarged to receive a spring seat 33 riveted thereto as at 34. A connector 35 is secured, as by rivets 36 and welding to the spring seat 33, and is hollow to receive the lower end of the shock absorber 28 for connection thereto by bolt 37. The connector carries at its upper end an apertured plate 38 engageable with the jounce bumper 25. A coil spring 39 having the ends thereof respectively engaged with the seats 23 and 33 serves to support the body and chassis on each wheel 10.

Figure 5:
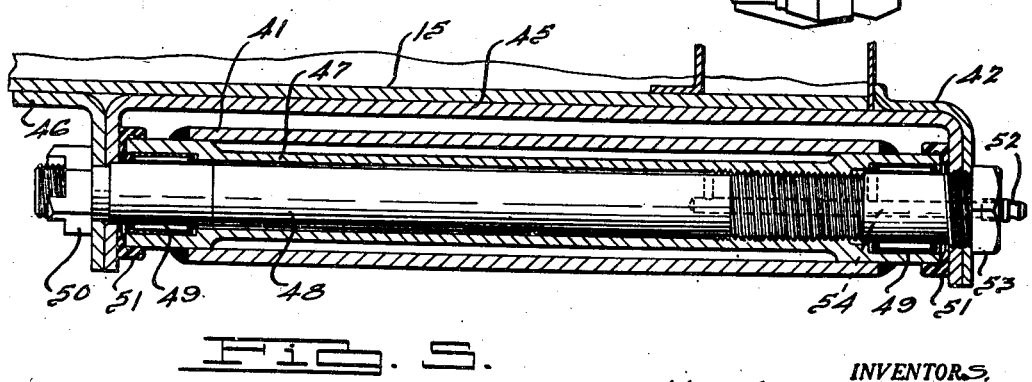
Fig. 5 is an enlarged sectional view taken approximately on line 5—5 of Fig. 1.

Each road wheel 10 is connected to the sprung part of the vehicle for rising and falling movement independently of the other, each such connection including an upper arm 40 and a lower arm 41, as more typically detailed in Figs. 3, 4, and 5. The front end of the chassis at either side has secured thereto an angle plate 42, as shown in Figs. 2 and 3, which carries a mounting 43 to which the forward end of the upper arm 40 is secured for oscillation about an axis, indicated by the line 44 in Fig. 1, extending transversely of the vehicle. The rearward end of the upper arm 40 has an articulated connection with the arm 30 of the knuckle support 12.

The lower arm 41 is provided by a hollow sheet metal structure which tapers from a maximum width at the forward end to a minimum at the rearward end. For mounting the forward end of the arm 41 the chassis is provided with a downwardly opening channel shaped member 45 welded or otherwise secured to the bottom flange of the chassis cross-member 15, as shown more particularly in Fig. 5. The angle plate 42 has outwardly and downwardly extending portions abutting the outer extremity of the member 45 and bracket 46 secured to the cross-member 15 has a flange abutting the inner leg of the member 45. A sleeve 47 extends through the forward end of the arm 41 and is welded thereto, this sleeve receiving a pivot pin 48 which is journalled therein by needle bearings 49. The pin 48 is also in threaded engagement with the sleeve, the outer flange of the member 45, and the adjacent portion of the angle plate 42 for the purpose of taking laterally directed thrust and locating the pin.

At the inner end the pin has a reduced section providing a shoulder and the adjacent flange of the member 45 is counterbored to provide a wall adjacent which the aforesaid shoulder abuts, the reduced section of the pin 48 extending through an opening in the bracket 46 and receiving a securing nut 50. A seal 51 is provided at each end of the sleeve 47 and a lubricant nipple 52 is provided at the head 53 of the pin, the latter being bored as at 54 to permit access of lubricant to the journalled surfaces.

The rearward end of the lower arm 41 is connected to the knuckle support 12 as more particularly shown in Fig. 4. A sleeve 55 extends through this end portion of the arm 41, being welded thereto for movement therewith, and receives a pivot pin 56 journalled in the bores 32 of the knuckle support part 31 by needle bearings 57. The pin 56 is secured to the arm 41 and sleeve 55 for movement therewith by a screw 58.

Stabilizing means for minimizing sway is provided in the form of a metallic torsion bar 59 extending transversely of the vehicle and having rearwardly extending arms respectively extending alongside the upper arms 40. As more particularly shown in Fig. 3, each arm has a first portion 62 secured at spaced locations, as at 60, to the upper arm 40 for oscillation therewith and a second portion 63 free for deflection relative to the portion 62 in response to vertical displacement of one wheel relative to the other. The main body of the bar 59 extends transversely of the vehicle, the longitudinal axis thereof being indicated by the line 61, and is torsionally active to resist relative oscillation of the arms 40. This portion of the part is disposed adjacent to the axis 44 and in such proximity thereto as to be free from any appreciable endwise tension due to movement of one of the arms 40 within its limits relative to the other arm 40, the portions 63 of the arms of the bar 59 being free to deflect and thus compensate for the tendency of the bar to elongate by reason of its displacement relative to the common axis of oscillation of the upper arms. In this manner the bar is torsionally activated in resisting relative arm movement but nevertheless does not prevent such arm movement within the limits prescribed for the suspension.

We claim:

1. In a vehicle, a pair of oppositely disposed road wheels and a vehicle part supported by said wheels, supporting and guiding means for each of said wheels accommodating independent rising and falling movements thereof, a weight supporting spring between said vehicle part and each of said means, each of said means including upper and lower disposed arms each connected to said vehicle part for oscillatory movement relative thereto to accommodate rising and falling movements of the associated wheel, said upper arms having a common axis for oscillatory movement relative to said vehicle part, and stabilizing means operable to oppose relative wheel movement including a bar having a torsionally active main body thereof disposed generally parallel to and immediately adjacent said common axis and an arm angled from each end thereof extending longitudinally of the vehicle therefrom beyond said common axis, each arm having a first portion parallel to and fixed at spaced locations to a respective upper arm for support thereby and movement therewith and a second portion intermediate said first portion and said main body free to deflect relative to its first portion and to said vehicle part incident to relative oscillation of said upper arms.

2. In a vehicle, a pair of oppositely disposed road wheels and a vehicle part supported by the wheels, supporting and guiding means for each of said wheels accommodating independent rising and falling movements thereof, each of said means including upper and lower disposed arms each connected to said vehicle part for oscillatory movement relative thereto to accommodate rising and falling movements of the associated wheel, the axis of oscillation of each upper arm extending transversely of the vehicle and being coaxial with the axis of oscillation of the other upper arm, and stabilizing means operable to oppose relative wheel movements including a bar having a torsionally active main body extending transversely of the vehicle and disposed generally parallel to and immediately adjacent said coaxial axes and an arm angled from each end of said main body, each arm having a first portion disposed parallel to and connected at spaced locations to a respective upper arm for support thereby and movement therewith and a second portion intermediate said first portion and said bar main body free to deflect relative to said first portion and said vehicle part in response to relative oscillation of said upper arms.

HAROLD A. HICKS.
CLIFFORD C. JACKSON.

(References on following page)

REFERENCES CITED

The following references are of record in the file of this patent:

UNITED STATES PATENTS

| Number | Name | Date |
|---|---|---|
| 2,090,141 | Newton | Aug. 17, 1937 |
| 2,122,476 | Leighton | July 5, 1938 |
| 2,164,470 | Opolo | July 4, 1939 |
| 2,208,538 | Brown | July 16, 1940 |
| 2,215,751 | Coleman | Sept. 24, 1940 |
| 2,254,261 | Best | Sept. 2, 1941 |

FOREIGN PATENTS

| Number | Country | Date |
|---|---|---|
| 566,570 | Great Britain | Jan. 4, 1945 |
| 798,613 | France | Mar. 10, 1936 |